United States Patent [19]

Ferrell

[11] 3,846,017
[45] Nov. 5, 1974

[54] EYEGLASSES

[76] Inventor: Blount Ferrell, Garden City, Utah 84028

[22] Filed: June 8, 1973

[21] Appl. No.: 368,344

[52] U.S. Cl............... 351/106, 16/128 A, 351/114, 351/129, 351/153
[51] Int. Cl. ....... G02c 5/16, G02c 5/02, G02c 5/22
[58] Field of Search .......... 351/110, 114, 118, 129, 351/103, 41, 106, 104, 149, 153; 16/128 A

[56] References Cited
UNITED STATES PATENTS

| 2,117,139 | 5/1938 | Bouchard | 351/110 |
| 2,419,303 | 4/1947 | Vasey | 351/118 X |
| 2,730,924 | 1/1956 | De Angeles | 351/103 |
| 2,746,087 | 5/1956 | Dolezal | 351/153 X |
| 2,797,617 | 7/1957 | Ring | 351/118 |

*Primary Examiner*—Paul A. Sacher

[57] ABSTRACT

Eyeglasses in which improved framings, an improved nose bridge connection between the framings and an improved hinge connection between the framings and the temple pieces are constructed to be sturdy, to prevent damage when the eyeglasses are placed on a surface, and to be easily fitted to the wearer.

2 Claims, 4 Drawing Figures

PATENTED NOV 5 1974 3,846,017

EYEGLASSES

This invention relates to eyeglasses and more particularly to eyeglasses that have improved framings, an improved nose bridge connection between the framings, and an improved hinge connection between the framings and the temple pieces.

Eyeglasses of many different constructions are now in use and vary from the conventional construction in which the framings and the nose bridge connection are molded as a single piece to the more unique construction in which the framings and the nose bridge connection are an assembly of individual discrete pieces. In eyeglasses of both the conventional and unique construction, the temple piece that extends from the framings to and around the ears is normally a single element of fixed length. In eyeglasses of the conventional construction, the framings and nose bridge connection are rigid, whereas in eyeglasses of the more unique construction the framings and nose bridge connection are less rigid and problems of rotation between the individual pieces are encountered. Also, in eyeglasses of both the conventional and unique construction a problem has existed in fitting the eyeglasses to the individual person because of the fixed length of the temple piece.

It is an object of the present invention to provide eyeglasses of unique construction in which the framings and nose bridge connection are assembled in such a manner as to provide a rigid construction.

It is another object of the present invention to provide eyeglasses which have temple pieces that can be either lengthened or shortened, allowing the eyeglasses to be easily fitted to the individual person.

It is still another object of the present invention to provide eyeglasses which give a transparent appearance.

These objects and other features and advantages of the present invention will be more clearly understood upon consideration of the following specification and the accompanying drawing pertaining to a disclosed embodiment of the invention, in which.

Figure 1:
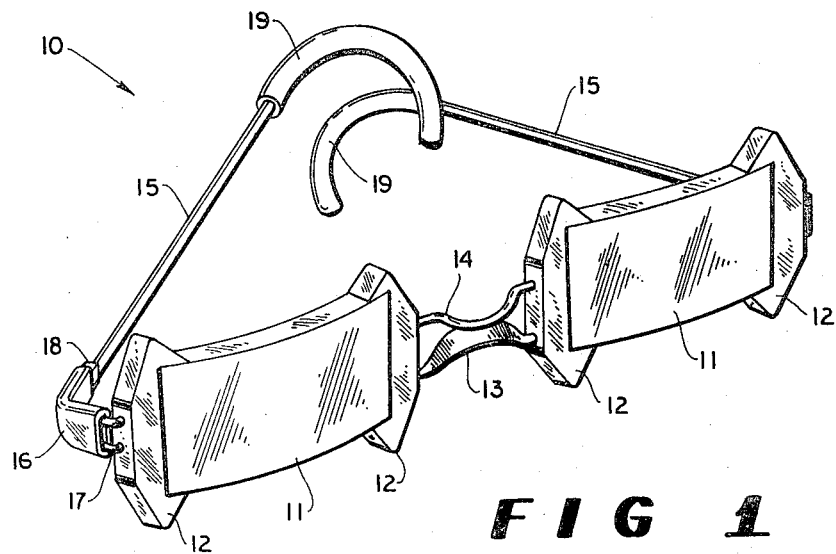
FIG. 1 is a perspective view of eyeglasses constructed in accordance with the present invention.

In accordance with the present invention there are provided eyeglasses in which the framings containing the lenses are securely connected to each other by a nose bridge connection in such a manner that the framings do not tend to rotate about the nose bridge connection. The nose bridge connection comprises a nose bridge piece and a brace. Additionally, the eyeglasses have framings that provide improved retention of the lenses within the framings and also protect the lenses when the eyeglasses are placed on a surface by supporting the lenses away from the surface. The eyeglasses are also provided with a hinge connecting the temple pieces to the framings which allows the temple pieces to be shortened or lengthened to fit the individual person.

Referring more particularly to FIGS. 1 to 4, there is shown eyeglasses 10 constructed in accordance with the preferred embodiments of the present invention in which lenses 11 are held at the internal end by inside cambered end caps 12 and at the external end by outside cambered end caps 12. Between the two inside end caps 12, there is a nose bridge piece 13 and a brace 14. Connecting each outside end cap 12 to the proximal end of temple piece 15 is a flexible tubular hinge 16. The proximal end of hinge 16 slips over the distal end of a connecting piece 17 inserted into each outside end cap 12, and the distal end of hinge 16 slips over a housing 18 into which the proximal end of temple piece 15 is inserted. Coupled over the distal end of temple piece 15 is a curved tubular piece 19 that fits over the top of and around the ear.

The lenses 11 preferably are either rectangular or square in shape in order to allow end caps 12 to fit more securely around the ends of lenses 11. The thickness and curvature of the lenses 11 will depend on the particular person's eyesight if the eyeglasses are to be corrective. If the eyeglasses are to be used for decorative purposes only, the thickness of the lenses 11 can be uniform over the entire length and the curvature of the lenses 11 can be chosen to produce a given effect. Preferably the lenses 11 are constructed of glass or plastic but may be of any other suitable material.

The end caps 12 have recessed portions for receiving the lenses 11. The recessed portions have an outer entry member through which the lenses 11 are inserted and an inner receiving member which contacts an edge of lenses 11 over the entire width of the lenses 11. The outer entry member has an opening which is slightly narrower than the width of the lenses 11, giving the end caps 12 the camber that is so necessary for securely holding the lenses 11. In inserting the lenses 11 into the end caps 12, it is essential that the camber be straightened to receive the lenses 11 in order to obtain the requisite pressure from the outer entry member on both the top and bottom sides of the lenses 11 after the lenses 11 are in place. In addition to the holding action of the recessed portions, the lenses 11 are also secured within the end caps 12 by any suitable adhesive at the interface between the inner receiving member and edge of lenses 11 along the entire width of lenses 11. The end caps 12 have raised portions that extend both above and below the top and bottom edges, respectively, of lenses 11, such that when the eyeglasses are placed on a surface, the raised portions support the lenses 11 away from the surface, thus preventing the lenses 11 from being scratched by the surface. Any suitable material such as acrylic plastic, metal, and the like can be used for the end caps 12 with transparent acrylic plastic being the preferred material.

Figure 2:
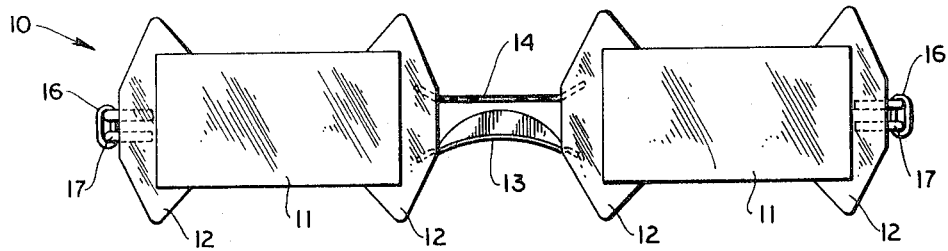
FIG. 2 is a front view of the eyeglasses of FIG. 1.
Figure 3:
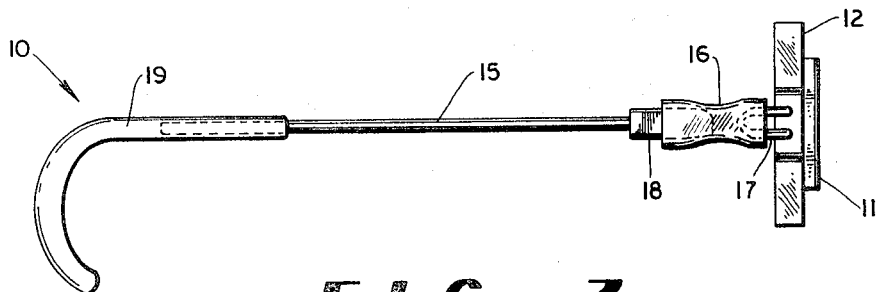
FIG. 3 is a side view of the eyeglasses of FIG. 1.
Figure 4:
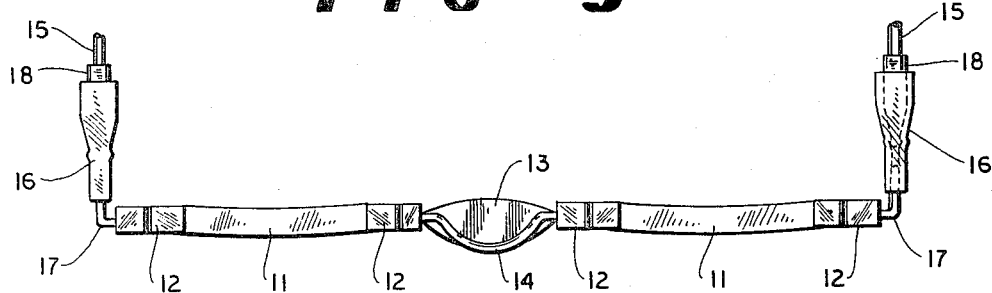
FIG. 4 is a top view of the eyeglasses of FIG. 1.

Connecting the two inside end caps 12 is a nose bridge connection comprising two pieces--nose bridge piece 13 and brace 14. The nose bridge piece 13 is curved in order to conform to the shape of the nose on which the nose bridge piece 13 rests when the eyeglasses 10 are being worn. As shown in FIG. 2, the ends of the nose bridge piece 13 that extend into the end caps 12 are angled in a downward direction. Spaced apart from and just above nose bridge piece 13 is brace 14 which extends horizontally between the two inside end caps 12. As shown in FIG. 2, the ends of brace 14 are angled in an upward direction after the brace 14 penetrates into end caps 12. By having two pieces as the nose bridge connection and by angling the two pieces in opposite directions and away from each other within the end caps 12, eyeglasses are obtained which are rigid and relatively free of any tendency of the framings rotating about the nose bridge connection. The two pieces comprising the nose bridge connection can be of any suitable material, including various metals, and preferably, the nose bridge connection is stainless steel.

Flexible tubular hinges 16 fit over the distal ends of connecting pieces 17 which extend outward from the edges of the outside end caps 12. Referred to FIG. 4, connecting pieces 17 are L-shaped with the proximal end inserted into end caps 12 and the distal end inserted into the proximal end of hinges 16. Into the distal end of flexible tubular hinges 16 there are inserted housings 18 which are themselves tubular, allowing them to house the proximal end portion of temple pieces 15 which are preferably thin stainless steel wire. The hinges 16 have an inner diameter that is slightly smaller than the outer diameters of the connecting piece 17 and housing 18, allowing the hinges 16 to hold both the connecting piece 17 and housing 18 tightly. The curved tubular pieces 19 fit over the distal ends of the temple pieces 15 and may be of any suitable material such as plastic, metal, or rubber.

The various pieces that are used along with the flexible tubular hinge 16 allow adjustment of the length of the temple piece 15 with relative ease. The length of the temple piece 15 can be adjusted by adjusting the length of flexible hinge 16 or by adjusting the amount of housing 18 that is inserted into flexible hinge 16.

It is apparent that the foregoing relates only to a preferred embodiment of the present invention, and that numerous alterations and modifications may be made therein without departing from the spirit and the scope of the invention as set forth in the following claims.

What is claimed is:

1. Eyeglasses comprising, in combination, a pair of substantially rimless lenses of a generally rectangular configuration, each of said lenses having top, bottom, nasal, and temple edges, a pair of end caps secured to each lens of said pair of lenses, one of said pair of end caps secured on the nasal side of each of said lenses and the other of said pair of end caps secured to the temple side of each of said lenses, each of said end caps having a recessed substantially c-shaped portion for receiving a respective nasal and temporal edge of one of said pair of lenses and extending over a portion of the top and bottom edges of said pair of lenses, wherein the distance between the top and bottom portions of said end caps in an unassembled state is slightly smaller than the top to bottom distance of each of the pair of lenses whereby to hold said lenses within said recessed portion of said end caps in a vise-like manner, a nose bridge connection between the lenses to hold same in spaced apart relationship, said nose bridge connection comprising a nose bridge piece and a brace, each of which extends into the two nasal oriented caps, a pair of L-shaped connecting members, each one of said L-shaped members secured to a respective temple end cap, a pair of flexible tubular hinge members, each one of said hinge members secured to a respective one of said L-shaped members and a pair of temple members, each one of said temple members secured to a respective one of said tubular hinge members, said flexible tube member and the connections between said temple members and said flexible tubular hinge members being such as to allow adjustment of the length of said temple members with relative ease.

2. Eyeglasses as described in claim 1 wherein each flexible tubular hinge is connected to a temple piece by a housing inserted in each flexible tubular hinge.

* * * * *